United States Patent

Urruela

Patent Number: 5,398,499
Date of Patent: Mar. 21, 1995

[54] ORIENTABLE AXISYMMETRIC NOZZLE OF VARIABLE GEOMETRY OF GAS TURBINE PROPULSORS

[75] Inventor: Jose R. Urruela, Las Arenas, Spain

[73] Assignee: Sener, Ingenieria y Sistemas, S.A., Vizcaya, Spain

[21] Appl. No.: 232,705

[22] Filed: Apr. 25, 1994

[30] Foreign Application Priority Data

Nov. 23, 1993 [ES] Spain .................................... 9302455

[51] Int. Cl.$^6$ ............................................. F02K 1/12
[52] U.S. Cl. ...................................... 60/232; 60/271; 239/265.35; 239/265.39
[58] Field of Search ............... 60/228, 230, 232, 242, 60/271; 239/265.35, 265.37, 265.39

[56] References Cited

U.S. PATENT DOCUMENTS

| | | | |
|---|---|---|---|
| 4,420,932 | 12/1983 | Mendez et al. | 60/242 |
| 4,662,566 | 5/1987 | Honeycutt, Jr. | 239/265.39 |
| 4,690,330 | 9/1987 | Robinson et al. | 239/265.39 |
| 4,994,660 | 2/1991 | Hauer | 60/232 |
| 5,039,014 | 8/1991 | Lippmeier | 60/271 |
| 5,076,496 | 12/1991 | Lippmeier | 239/265.41 |
| 5,082,182 | 1/1992 | Bruchez, Jr. et al. | 60/230 |
| 5,285,637 | 2/1994 | Barcza | 239/265.35 |
| 5,328,098 | 7/1994 | Barcza et al. | 239/265.39 |
| 5,335,489 | 8/1994 | Thayer | 60/230 |

FOREIGN PATENT DOCUMENTS

| | | |
|---|---|---|
| 0595753 | 5/1994 | European Pat. Off. |
| 2318607 | 11/1973 | Germany ............ 239/265.39 |
| 2098280 | 11/1982 | United Kingdom ...... 239/265.35 |

*Primary Examiner*—Timothy S. Thorpe
*Attorney, Agent, or Firm*—Ostrolenk, Faber, Gerb & Soffen

[57] ABSTRACT

Orientable axisymmetric nozzle of variable geometry for gas turbine engines which comprises convergent (2) and divergent (3) sections formed by master petals (4, 5) and slave petals (33, 34) duly connected together, each divergent master petal (5) being connected to an outer annular control part (6) by a biarticulated bar (15). This bar is connected by one end to the part (6) by a cylindrical articulation (16) while by its opposite end it is connected to the divergent master petal (5) via intermediate bars (26, 27).

7 Claims, 10 Drawing Sheets

ORIENTABLE AXISYMMETRIC NOZZLE OF VARIABLE GEOMETRY OF GAS TURBINE PROPULSORS

BACKGROUND OF THE INVENTION

The present invention refers to a convergent-divergent nozzle of variable geometry capable of orienting the flow of gas, for a gas turbine engine, used as a means of propulsion in aviation.

More specifically, in a preferred application, the nozzle to which the present invention relates is of the axisymmetric type, comprising a convergent zone followed, in the direction of flow, by a divergent zone, both of which are formed by master petals distributed circumferentially around the longitudinal axis of the engine and connected to each other by articulations and by slave petals, also connected together by articulations and distributed circumferentially around the longitudinal axis of the engine. The convergent zone defines an A8 throat of variable area. The divergent zone, which is also of variable geometry, may be actuated so as to orient the flow of gas and, therefore, the thrust in any direction on a cone directed around the longitudinal axis of the propulsor.

Maneuverability of airplanes is essential. Maneuverability has been obtained up to now by aerodynamic forces, but it can be substantially improved by changing the orientation of the flow from its normal axial direction of actuation.

Orienting the flow of gas has been used for many years in rocket motors. In those engines, the systems are much simpler, since their nozzles are of constant geometry.

Convergent-divergent nozzles of variable geometry have relatively recently been introduced in supersonic planes driven by turbojet or turboprop engines. In this class of nozzles, the systems for orienting the flow are not yet in an operational stage, but are instead in the experimental or developmental phase. Those of the two-dimensional type in which the flow is oriented only in one plane are in the most advanced state.

It is of particular advantage to orient the flow in nozzles with axial symmetry since the direction of the flow can then be varied in any axial plane, with the pitch and yaw planes being particularly important.

Various prior patents cover mechanisms for orienting the flow in this type of nozzle, since it is theoretically possible to effect this in different ways, although it is very difficult for the mechanisms not to have a high degree of complexity.

To orient only the divergent zone of the nozzle downstream of the A8 throat area has the advantage that the disturbances induced by the orientation are not transmitted upstream of the engine and that the sealing of the spaces between the different moving parts is simplified. There still remains the problem of the seal between divergent master petals during the orienting of the flow. With regard to this, reference should be had to U.S. Pat. No. 4,994,660 and to Spanish Application No. 9200369 of 1992, which disclose different embodiments of nozzles in which only the divergent zone, or a part of it, respectively, is oriented.

In order to seal the spaces between divergent master petals there are various solutions, such as those contained in U.S. Pat. Nos. 4,690,330, 4,662,566, 5,039,014 and 5,076,496, and Spanish Applications Nos. 9200369 of 1992, 9202157 of 1992, and No. 9301991 of 1993.

Spanish Patent Application No. 9200369 of 1992 describes an orientable axisymmetric nozzle of variable geometry for gas turbine engine. This nozzle consists of a convergent zone and a divergent zone, both of which are formed of master petals and slave petals distributed circumferentially around the longitudinal axis of the engine. Control and outer radial support means are provided for regulating the throat area, and control means is provided for regulating the orientation of the flow. Its novel feature is the fact that the variation of the A8 throat area and the orientation of the flow are effected by a single control system which is formed of three annular parts which are concentric to each other and to the longitudinal axis of the engine and by a plurality of linear actuators articulated at their upstream end to the fixed structure of the engine.

The annular parts are connected to each other and to the fixed structure of the engine by articulation elements and guide devices. These permit the joint axial displacement of the three annular parts by the same amount with respect to the fixed structure of the engine, and permit a movement of relative rotation of the intermediate and outer annular parts with respect to each other and with respect to the inner annular part. This thus permits the inclination of the outer annular part in any direction, with a center of rotation on the longitudinal axis of the engine.

The convergent master petals are connected at their upstream ends to the inner annular part by cylindrical articulations which are tangential to a theoretical circumference which is concentric to the longitudinal axis of the engine and is located in a theoretical plane perpendicular to the longitudinal axis of the engine. The outer annular part, in turn, is connected by spherical articulations to the downstream end of the linear actuators.

The mechanism for variation of the A8 throat area is formed of a lever which is firmly attached to the fixed structure of the engine on which there rests and rolls a roller which is mounted, with the possibility of free rotation, on the corresponding convergent master petal.

The master petals of the divergent zone are subdivided transversely into two sections which are connected together by a cylindrical articulation, the axis of which is perpendicular to the axis of articulation between the master petals of the convergent and divergent zones. The downstream section is connected to the outer annular part by a bar which is connected to the downstream section by a spherical articulation, and is connected to the outer annular part by a cylindrical articulation which is tangential to a theoretical circumference which is concentric to the longitudinal axis of the engine and located in a theoretical plane perpendicular to such longitudinal axis.

The upstream section of each divergent master petal is connected, at its upstream end, to the corresponding convergent master petal by a cylindrical articulation, tangential to a theoretical circumference which is concentric to the longitudinal axis of the engine and located in a theoretical plane perpendicular to such longitudinal axis.

Spanish Patent Application No. 9202157 of 1992 describes a design of a divergent slave petal for sealing of longitudinal space between contiguous divergent master petals. The geometry of the longitudinal spaces between divergent master petals is changed during the orientation of the flow, changing from an approximately rectangular form to that of an adjusted surface, the sides of which are no longer parallel.

This reference proposes converting every divergent slave petal into a deformable structural unit of minimum stiffness in torsion, which is formed of a base plate and a plurality of discrete transverse elements inserted in the base plate. The base plate imparts axial stiffness to the unit, serving as element for bearing the axial forces due to the flow of gas, the cooling air, and the inertia forces, but presenting minimum ability to transmit transverse forces. On their part, the discrete transverse elements lack an ability to transmit torsion, but they do transmit the transverse forces and the shearing forces imposed both by the flow of gas and by the divergent master petals to which the gas pressure exerted on the base plate bearing the axial forces is transmitted.

Thus, Spanish Patent Applications 9200369 and 9202157 of 1992, disclose a mechanism capable of orienting the flow of gas by acting solely on a part of the divergent zone of the nozzle with a suitable sealing of the longitudinal space between contiguous divergent master petals. U.S. patent application Ser. No. 08/232,706, filed on even date herewith in the names of Jose Rivacoba Urruola and Jose Ignacio Ibarreche Mendia and entitled "Divergent Master Petal for Orientable Nozzles of Variable Geometry Intended for Gas Turbines", the entire disclosure of which is incorporated by reference herein, describes a divergent master petal which makes it possible to increase the maximum angle of orientation of the flow with respect to that obtainable with the embodiments set forth in Spanish Patent Applications Nos. 9200369 and 9202157.

In orienting the divergent zone of the nozzle, the divergent master petals, as described in Spanish Patent Application No. 9200369, are forced to move in radial and tangential directions with respect to the longitudinal axis of the engine. The maximum angle of orientation of the divergent zone for a given A8 throat area is limited by the interferences between master and slave petals in zones near the A9 exit area. As indicated previously, Spanish Patent Application 9202157 of 1992 proposes converting the divergent slave petal into a deformable structural unit of minimum stiffness in torsion, which is formed by a base plate bearing the axial forces and with minimum capacity to transmit transverse forces. The base plate includes discrete transverse elements with capacity to transmit the transverse forces and the shearing forces imposed both by the flow of gas and by the divergent master petals. If the inner surface of the divergent master petals, which is the surface in contact with the flow of gas, is flat, the maximum angle of orientation of the flow is determined by the interference in zones close to the A9 exit area of the inner surface with the discrete transverse elements because, in this case, the longitudinal edges of the base plate do not rest on the inner surface of the divergent master petals, a longitudinal opening appearing which permits the passage of the gases to the outside.

In order to solve this problem, the abovementioned U.S. Application filed on even date herewith proposes a divergent master petal which has an inner surface, which is in contact with the flow of gas and is of a shape that is variable between two cross sections, one of them straight, so as to coincide with or be close to the upstream end transverse edge of the petal, and the other one curved convexly so as to coincide with or be close to the downstream end transverse edge of said petal, the convexity of the curvature being directed toward the inside of the engine. The transmission between the two cross sections is effected gradually and smoothly in order to permit continuous contact of the divergent slave petal with the inner surface.

SUMMARY OF THE INVENTION

The present invention is directed to a divergent master petal and a system for connecting it to the outer annular part, which makes it possible to increase the maximum angle of orientation of the flow as compared with that obtainable with any of the prior art arrangements.

Upon adoption of the configuration described in the above-mentioned U.S. Patent Application filed on even date herewith for the divergent master petal, the problem of interferences in zones close to the A9 exit area between the inner surface of the divergent master petal and the discrete transverse elements which form part of the divergent slave petal described in Spanish Patent Application 9202157 is eliminated. Then, the maximum angle of orientation of the flow is limited by the interferences between each of the divergent master petals or between each of the slave or divergent petals, or because the divergent slave petal does not rest in the zone of the A9 exit area on the corresponding divergent master petals. This happens because in the embodiments set forth in Spanish Patent Application No. 9200369, the downstream section of each divergent master petal is connected to the outer annular part by a single bar which is connected to such section by a spherical articulation and is connected to the outer annular part by a cylindrical articulation, tangential to a theoretical circumference concentric to the longitudinal axis of the engine and located in a theoretical plane perpendicular to such longitudinal axis. In this way, the rotation experienced by the outer annular part around a point or the longitudinal axis of the engine during orientation of the flow determines, for each divergent master petal, movements in the radial and in tangential directions which are such that, for a selected ratio between the A8 throat area and the A9 exit area. The movements in the radial and tangential direction are mutually interrelated such that it is not possible to increase the tangential movement of the downstream section of the divergent master petal without appreciably varying its radial movement.

In order to solve this problem, the present invention proposes a divergent master petal, the downstream section of which is formed by a braced system which is connected to the outer annular part by a connecting system formed of a biarticulated bar connected to both the downstream section and the outer annular bar by means of cylindrical articulations. When there is no orientation of the flow, the cylindrical articulations are tangential to a theoretical circumference concentric to the longitudinal axis of the engine and is located in a theoretical plane perpendicular to such longitudinal axis.

The braced system which constitutes the downstream section of the divergent master petal is formed by a stiffened plate, the inner surface of which is in contact with the flow of gases and which is connected at its upstream end to the downstream section of the divergent master petal by a cylindrical articulation and by two intermediate bars. One of the intermediate bars is located upstream of the other bar with each bar being connected at one end to the stiffened plate by a spherical articulation and at its other end being connected to the other bar by a spherical articulation.

The downstream section of the divergent master petal is connected to the outer annular part by a biarticulated bar which, at its upstream end, is connected to the outer annular part by a cylindrical articulation which, when there is no orientation of the flow, is tangential to a theoretical circumference concentric to the longitudinal axis of the engine and is located in a theoretical plane perpendicular to the longitudinal axis of the engine and at its downstream end is articulately connected to the linking end of the two intermediate bars which form part of the downstream section. The articulated connection is such that the biarticulated bar defines, with the intermediate bar located upstream, a cylindrical articulation which, when there is no orientation of the flow, is tangential to a theoretical circumference concentric to the longitudinal axis of the engine and is located in a theoretical plane perpendicular to the longitudinal axis; with the intermediate bar located downstream, the biarticulated bar defines a spherical articulation.

As a result, during orientation of the flow, the tangential movement experienced by the downstream section of the divergent master petal is defined solely by the connection of the biarticulated bar to the outer annular part and by the intermediate bar located upstream. Accordingly, by maintaining the point of connection of the biarticulated bar and the two intermediate bars and by modifying the longitudinal position of the spherical articulation which connects the stiffened plate and the tie rod located upstream, it is possible to most conveniently regulate the tangential movement of the downstream section of the divergent master petal for a fixed radial movement thereof.

Other features and advantages of the present invention will become apparent from the following description of a non-limiting embodiment of the invention which refers to the accompanying drawings.

DETAILED DESCRIPTION OF THE INVENTION

Figure 1:
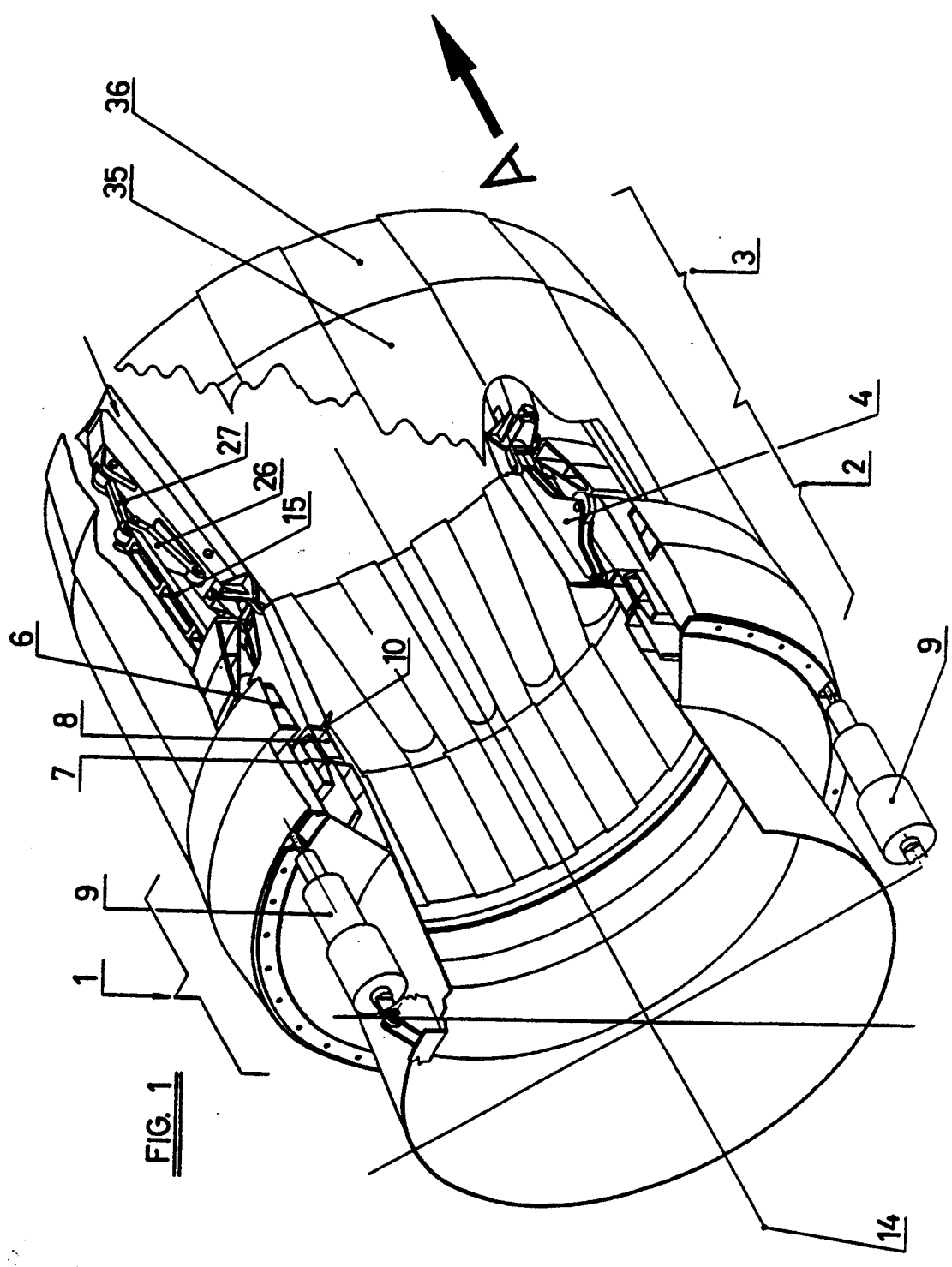
FIG. 1 is a perspective view, partially in section, of an orientable nozzle developed in accordance with the invention.

FIG. 1 shows a schematic perspective view, partially in section, of the nozzle. The arrow A indicates the direction of flow or circulation of the gases. Like traditional nozzles, the nozzle shown in FIG. 1 includes a rear casing, indicated by the numeral 1, which constitutes the end of the fixed structure of the engine, a convergent zone, indicated by the numeral 2, and a divergent zone indicated by the numeral 3. The convergent zone 2 is formed of a plurality of master petals designated 4 and slave petals, not shown. In the same way, the divergent zone 3 is formed of master petals 5 and slave petals, not shown. The nozzle also includes a control system for the A8 throat area, designated 12 in FIG. 5. The A8 throat area is defined by the intersection between the convergent petals 4 and divergent petals 5, and is for orienting the flow.

Varying the A8 throat area and orienting the flow are effected by a single control system which is formed of three annular parts 6, 7 and 8, which are concentric to each other and to the longitudinal axis 34 of the engine, and by a plurality of linear actuators 9 which are articulated at their upstream ends to the casing.

The convergent master petals 4, as shown in FIGS. 5 to 8, are connected, at their upstream ends, to the inner annular part 8. This connection is effected by cylindrical articulations 10 tangential to a theoretical circumference which is concentric to the longitudinal axis of the engine and is located in a theoretical plane perpendicular to such longitudinal axis.

Figure 2:
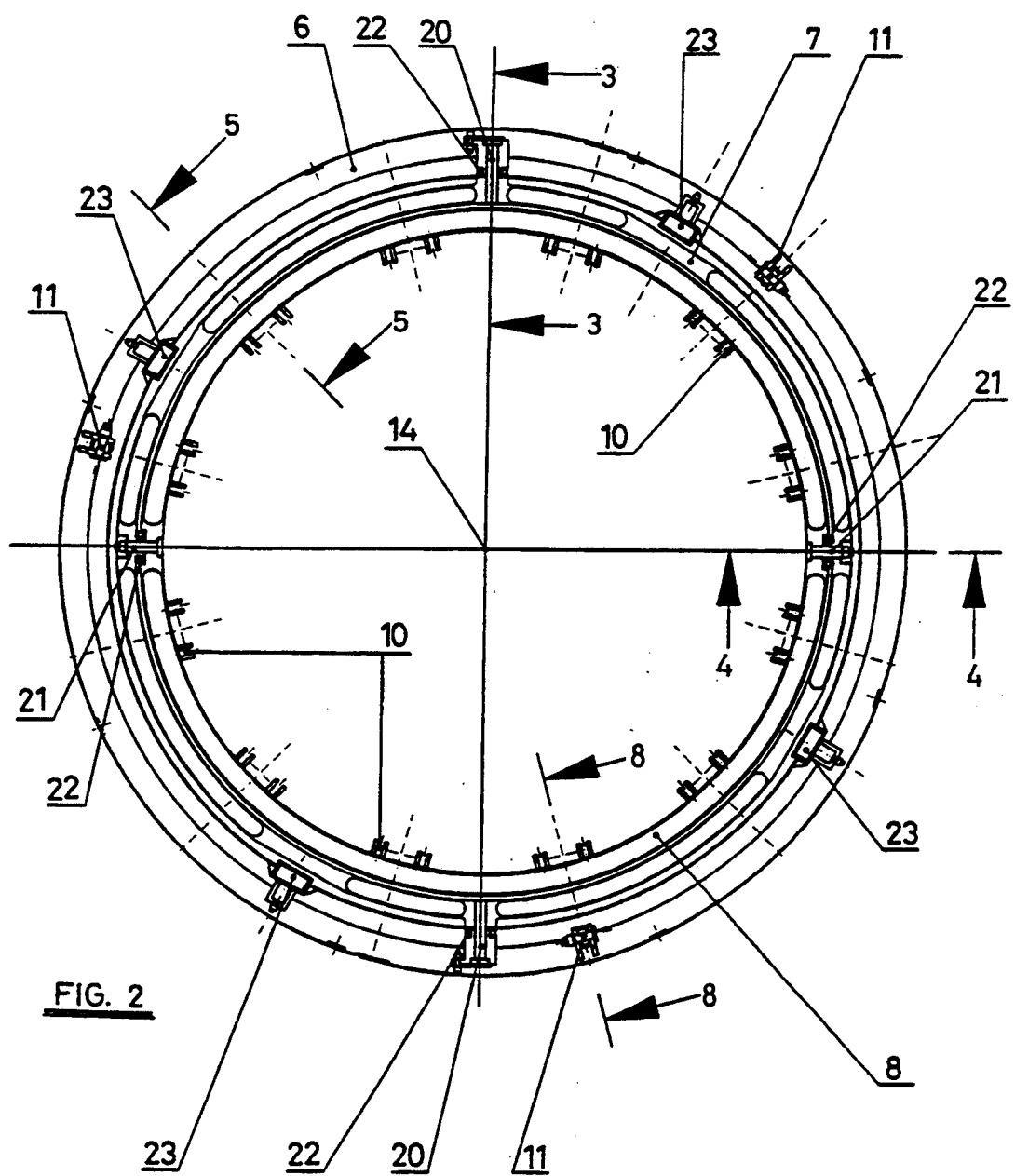
FIG. 2 is a cross section through the nozzle along the section line 2—2 of FIG. 3, showing the connections between the elements which form the system for the simultaneous control of the A8 throat area and the orientation of the flow.
Figure 7:
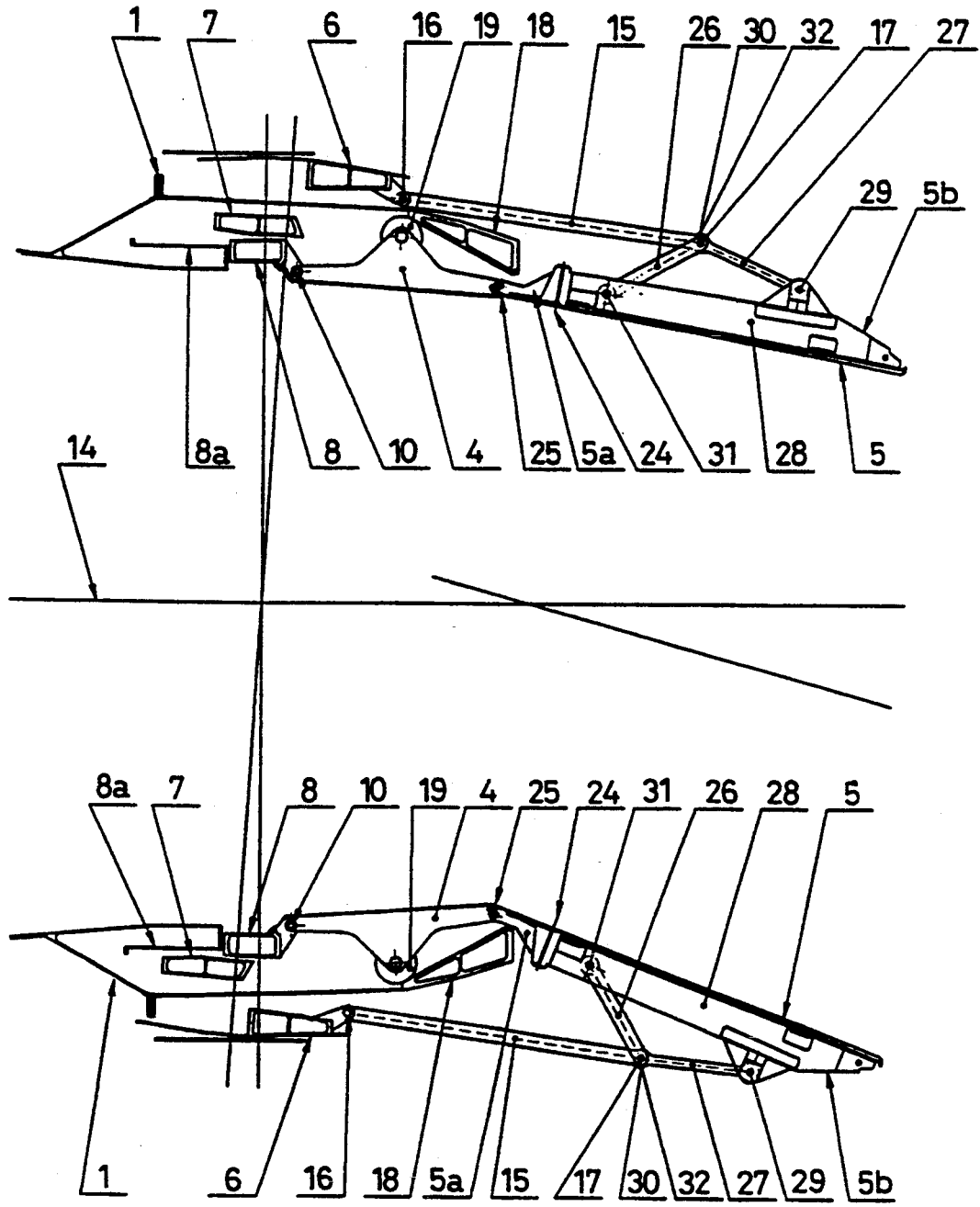
Figure 8:
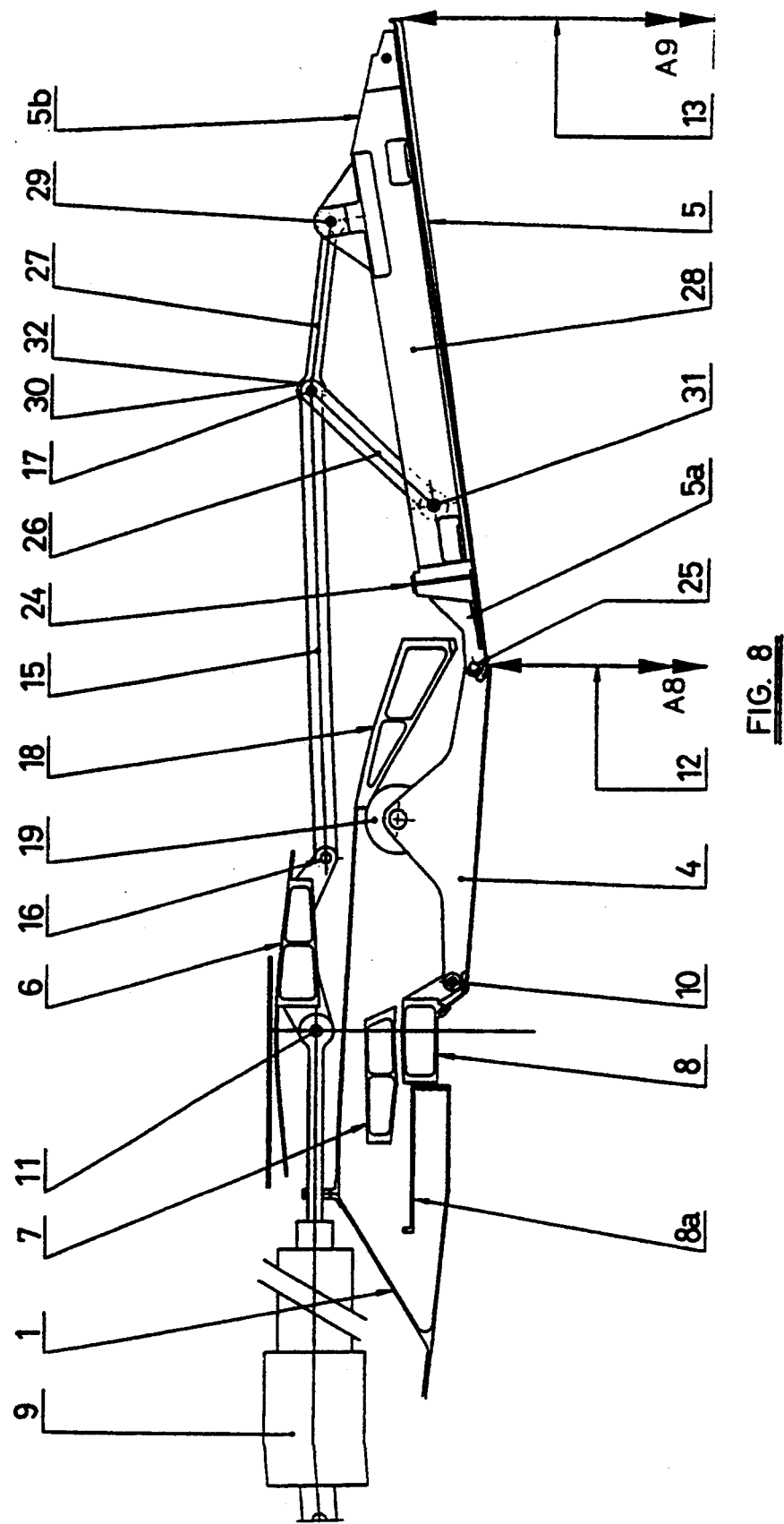
FIG. 8 is a longitudinal section through the nozzle along the section line 8—8 of FIG. 2, with the nozzle in open position, without orientation of the thrust.

The downstream ends of the linear actuators 9 are connected to the outer annular part 6 by spherical articulations 11 (FIGS. 2 and 8). Furthermore, the outer annular part 6 is connected to the divergent master petals 5 by biarticulated bars 15 which are mounted concentrically around the axis 34 of the engine. Each biarticulated bar 15 is connected to the outer annular part 6 by a cylindrical articulation 16, while its connection to the divergent master petal 5 is effected by means of a cylindrical articulation 17 (FIGS. 5 to 8 and 11). The two cylindrical articulations, 16 and 17, are so arranged that, without orientation of the flow, they are tangent to a theoretical circumference which is concentric to the longitudinal axis of the engine and is located in a theoretical plane perpendicular to such longitudinal axis.

The control system of the nozzle includes, furthermore, a mechanism for modifying the A8 throat area, designated by the numeral 12, which mechanism, as shown in FIGS. 5 to 8, is formed of a lever 18 which is firmly attached to the casing 1 of the engine, on which there rests and rolls a roller 19 mounted, with the possibility of free rotation, on the corresponding convergent master petal.

The annular parts 6, 7 and 8 are furthermore connected to each other by devices which permit the axial displacement of the group of three parts by an equal amount, with respect to the structure of the engine, as well as relative rotation of the intermediate annular part 7 and the outer annular part 6 between themselves and with respect to the inner annular part 8, so as to permit the inclination of the outer annular part 6 in any direction with respect to a center of rotation on the axis 14 of the engine. In this way, the outer annular part 6 and the inner annular part 8 are permitted to carry out between themselves, through the intermediate annular part 7, a relative movement of rotation in space, thereby defining a spherical joint. For this, the annular parts 6 and 7 are connected together by a cylindrical articulation, defined by a pair of shafts 20, as shown in FIGS. 2 and 3, which are aligned in diametrically opposite positions, while the annular parts 7 and 8 are connected to each other by another cylindrical articulation defined by a pair of shafts 21, which are also aligned with each other diametrically, in positions perpendicular to the shafts 20.

Figure 3:
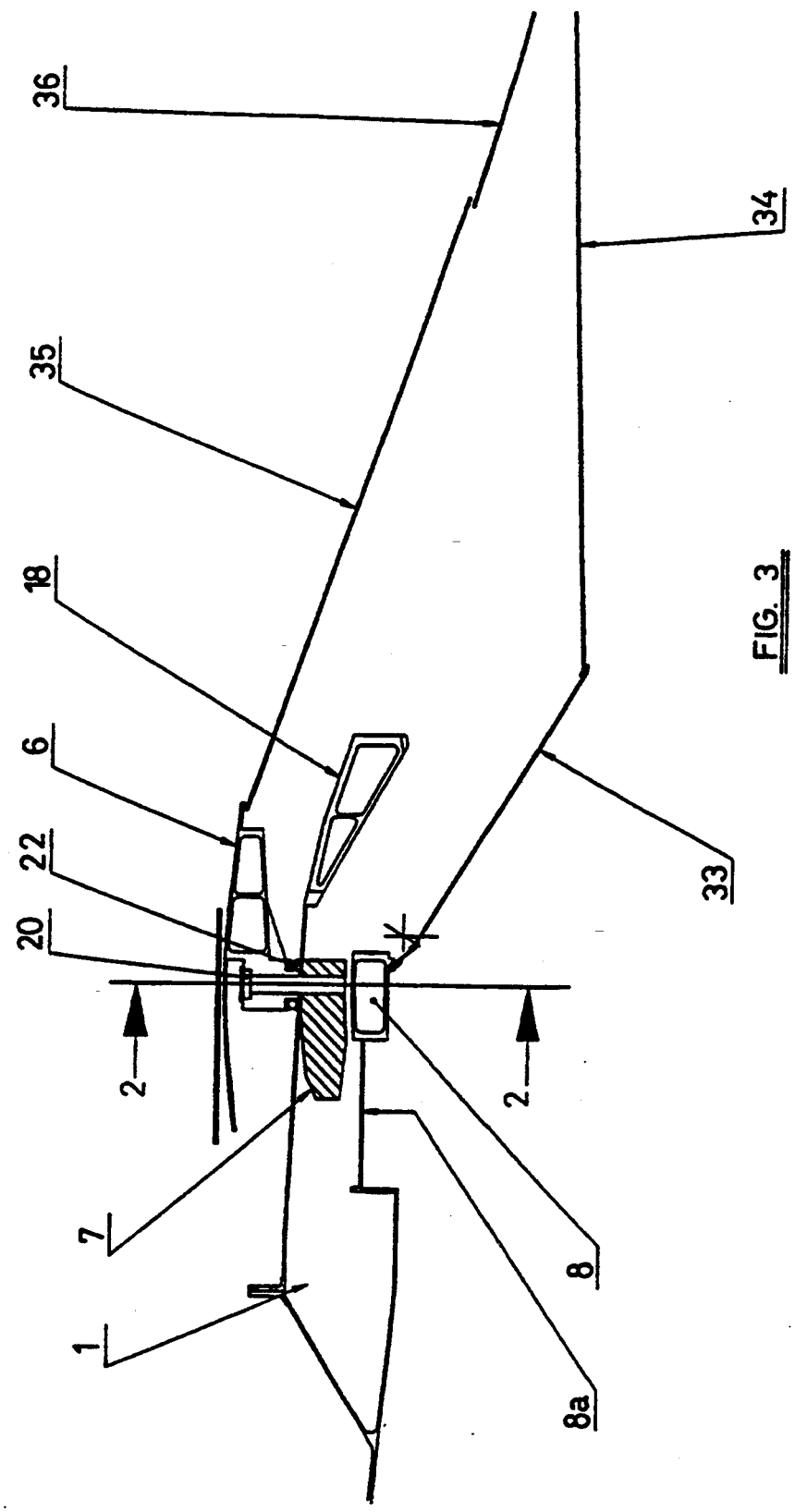
FIG. 3 is a longitudinal section through the nozzle along the section line 3—3 of FIG. 2, showing the nozzle in closed position without orientation of the flow.
Figure 4:
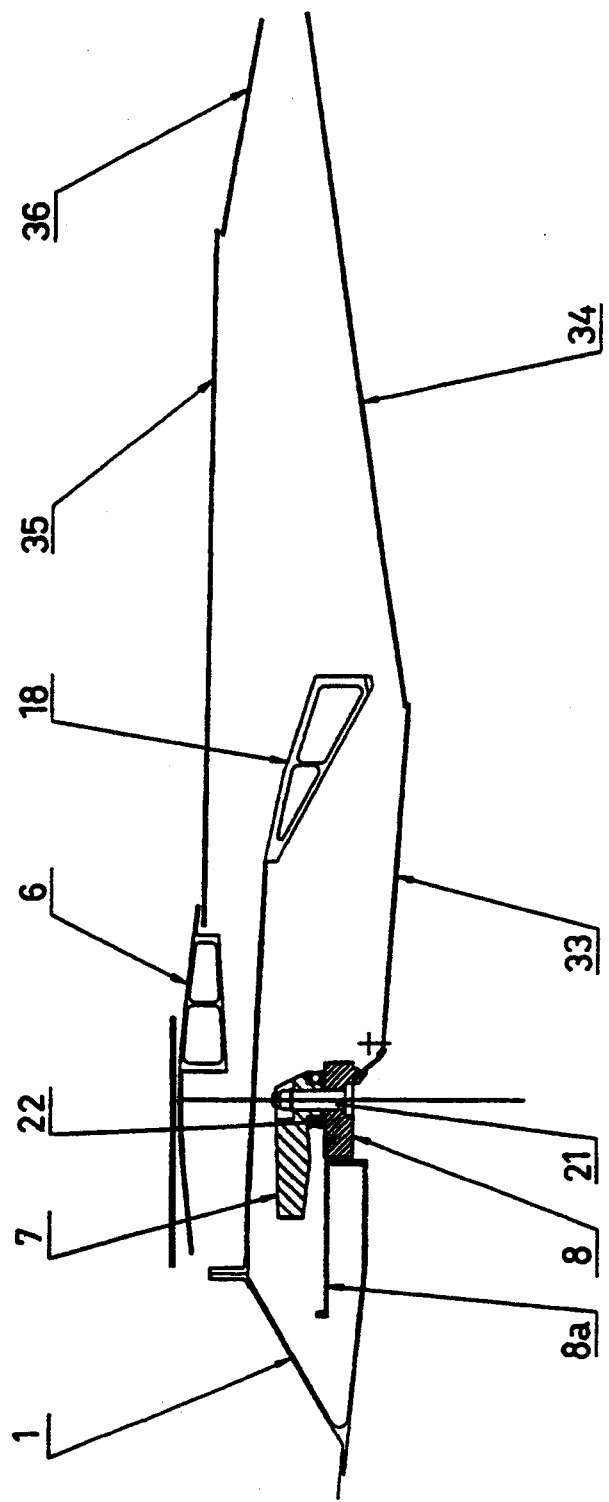
FIG. 4 is a longitudinal section through the nozzle along the section line 4—4 of FIG. 2, with the nozzle in closed position and without orientation of the flow.

In order to reduce the play between the annular parts 6, 7 and 8 and minimize the rubbing between them during their relative rotation, axial thrust bearings, designated 22 in FIGS. 2, 3 and 4, are arranged concentrically to the shafts 20 and 21.

As can be seen from FIGS. 3 to 8, the annular part 8 has a cylindrical extension 8a, by which there is obtained the sealing of the "post-combustor" during the adjustment of the A8 throat area 12 of the nozzle. The axis of this cylindrical extension 8a must be located at all times on the longitudinal axis 14 of the engine. For this purpose, on the upstream end of said cylindrical extension 8a, rollers, not shown, are arranged so as to move only in an axial direction on the inside of guides integral with the casing 1 of the engine in order to define a guide device for the annular part 8, as set forth in Spanish Patent Application No. 9200369.

Similarly, the annular part 6 is guided by a device formed by the rollers 23 (FIG. 2) which can move only in an axial direction, within guides integral with the casing 1, with a small amount of play in order to permit the rotation of this annular part 6 around any diameter. The guides of the annular parts 6 and 8 will absorb the net shearing forces which appear during the orientation of the flow and those due to asymmetries of the loads.

Figure 5:
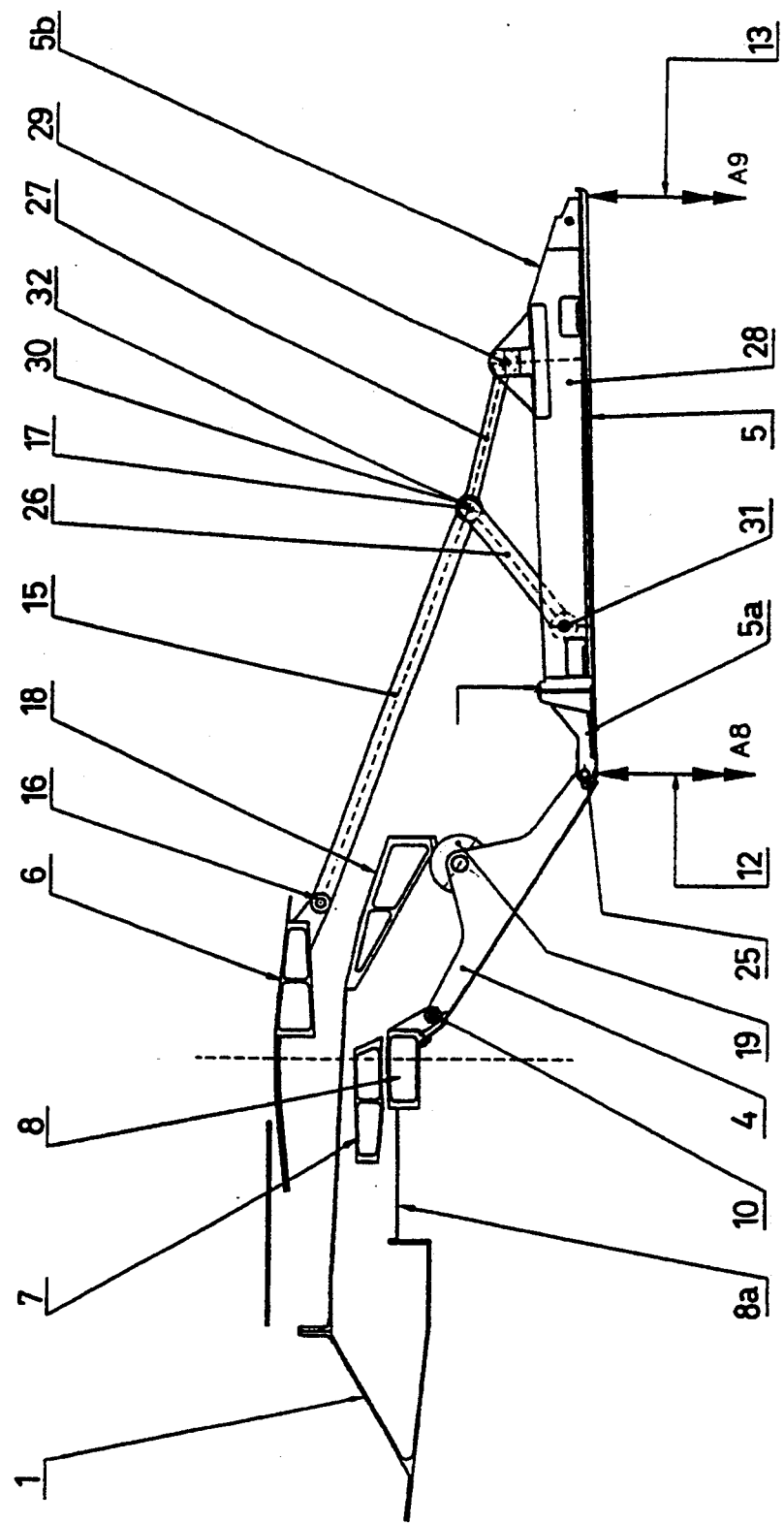
FIG. 5 is a longitudinal section through the nozzle along the section line 5—5 of FIG. 2, with the nozzle in closed position, without orientation of the thrust.

The arrangement thus far described and shown, permits the following movements by activation in one or the other direction of the linear actuators 9:

Axial movement of the assembly of annular parts 6, 7 and 8, together with the biarticulated bars 15, and the petals 4, making it possible to vary the A8 throat area, indicated by 12 in FIGS. 5 and 8. The displacement of the annular parts 6, 7 and 8 by the action of the linear actuators 9 causes the radial displacement of the convergent master petals 4 via the articulation 10. The convergent master petals 4, due to the lever 18 and by means of the roller 19, open or close in radial direction, defining, together with the biarticulated bars 15, the position of the divergent master petals 5. In this case, the linear actuators 9 will always have the same length.

Each of the actuators 9 can lengthen or shorten so that the outer annular part 6 is moved over a theoretical spherical surface, centered on the longitudinal axis 14 of the engine, the annular part 8 remaining fixed in axial position and there then taking place, through the same mechanisms, the orientation of the flow in any direction around the longitudinal axis 14 of the engine.

Figure 9:
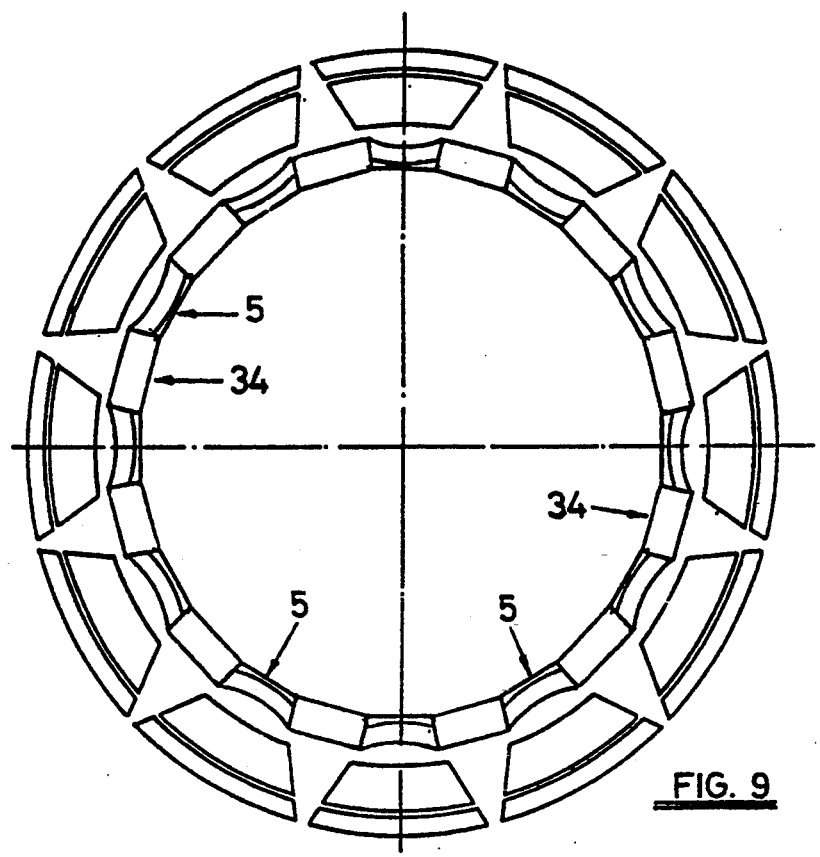
FIGS. 9 and 10 are rear views of the nozzle, without orientation of the flow and with orientation of the flow, respectively.
Figure 10:
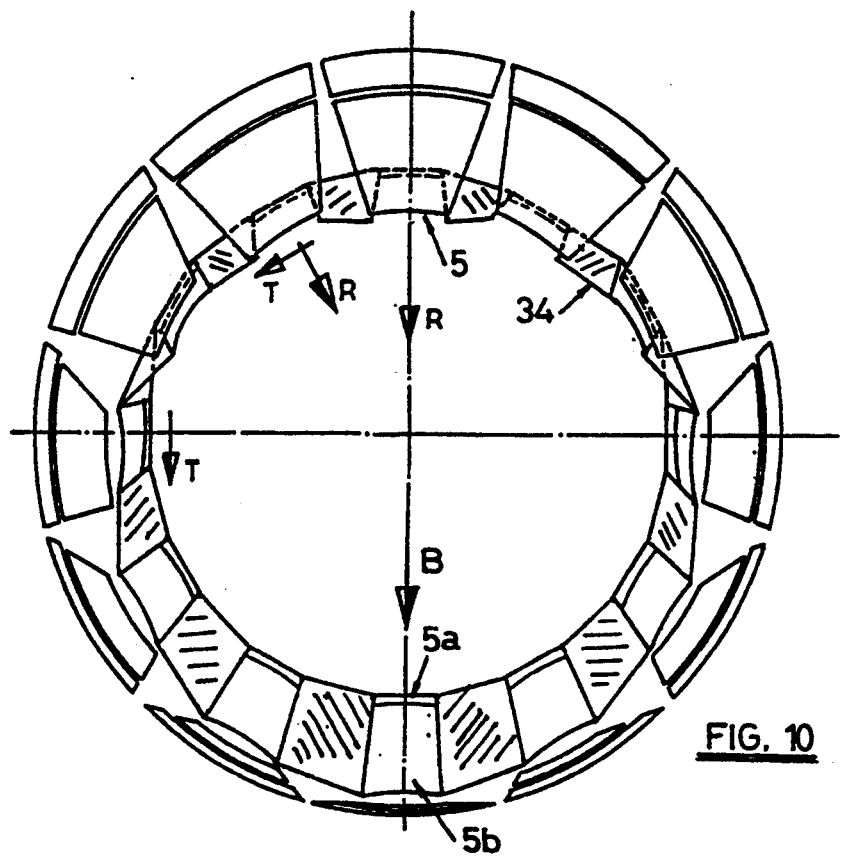

In the actuation indicated, the biarticulated bars 15, which are connected by a cylindrical articulation 16 to the annular part 6, turn with the latter and cause the divergent master petals 5 to move in a radial direction, which movement is indicated by the arrow R in FIG. 10, and in a tangential direction, which movement is indicated by the arrow T in FIG. 10, thus making it possible to obtain the orientation of the flow in the direction indicated by the arrow B. For this purpose each divergent master petal 5 is subdivided into two sections, designated by the numerals 5a and 5b, connected together by a cylindrical articulation 24 arranged in a direction perpendicular to the center line of the base of the petal 5, as can be better noted from FIGS. 5 to 11. The element or section 5a is connected by a cylindrical articulation 25 to the convergent master petal 4, as seen in FIGS. 5 to 8. The downstream section 5b of the divergent master petal is formed of a braced system of two intermediate bars 26 and 27, one located upstream with respect to the other, and a stiffened plate 28, the inner surface of which is in contrast with the flow of gases. The intermediate bar 27 located downstream is connected at one end by a spherical articulation 29 to the stiffened plate 28 and, at its other end, by another spherical articulation 30, to the intermediate bar 26 located upstream. The intermediate bar 26, which is located upstream is, in its turn, connected at one end by a spherical articulation 31 to the stiffened plate 28 while, at its other end, it is connected by a cylindrical articulation 32 to the biarticulated bar 15. The spherical articulation 30, which is located on the axis of the cylindrical articulation, connects the downstream intermediate bar 27 to the upstream intermediate bar 26. In this way, the geometry which defines the tangential movement of the downstream section 5b of the divergent master petals 5, is made independent of the geometry which defines the radial movement of the sections 5a and 5b during orientations of the flow. In fact, upon rotation of the outer annular part 6, through the biarticulated bar 15 and the intermediate bar 26 located upstream, the section 5b located downstream of the divergent master petal is compelled to experience a tangential movement defined by the bar 15 and the intermediate bar 26 and their respective points of articulation.

The radial movements experienced by the divergent petal depends fundamentally on the geometrical positions of the articulations 16, 17, 25, 29, 30 and 32. Thus, maintaining the geometrical positions of these articulations fixed and modifying the geometrical position of the spherical articulation 31 which connects the upstream intermediate bar 26 and the stiffened plate 28, enables the tangential movement of the section 5b to be increased or decreased during orientation of the flow, without substantially changing the radial movement of the divergent master petal 5, with and without orientation of the flow, as can be better noted from FIGS. 5 to 11.

In FIG. 3, the nozzle is shown in closed position without orientation of the flow, while in FIG. 4, the nozzle is shown in open position, also without orientation of the flow.

In both FIGS. 3 and 4, there are diagrammatically shown the convergent slave petal 33 and divergent slave petal 34 for sealing the spaces between the master petals 4 and 5. As explained previously, in Spanish Patent Application 9202157 of 1992, a solution is proposed for the divergent slave petal 34 which makes it possible to solve the problem of the space between divergent master petals during orientation of the flow.

The inner surface of the divergent master petal has been shown in FIGS. 1 and 5 to 11 as it is proposed in the above-mentioned U.S. Patent Application filed on even date herewith, that is, with a form variable between two cross sections, one of them straight and located close to the upstream transverse edge of the divergent master petal 5 and the other curved convexly, at or close to the downstream end transverse edge of the petal 5 and with its convexity directed towards the longitudinal axis 14 of the engine.

Figure 6:
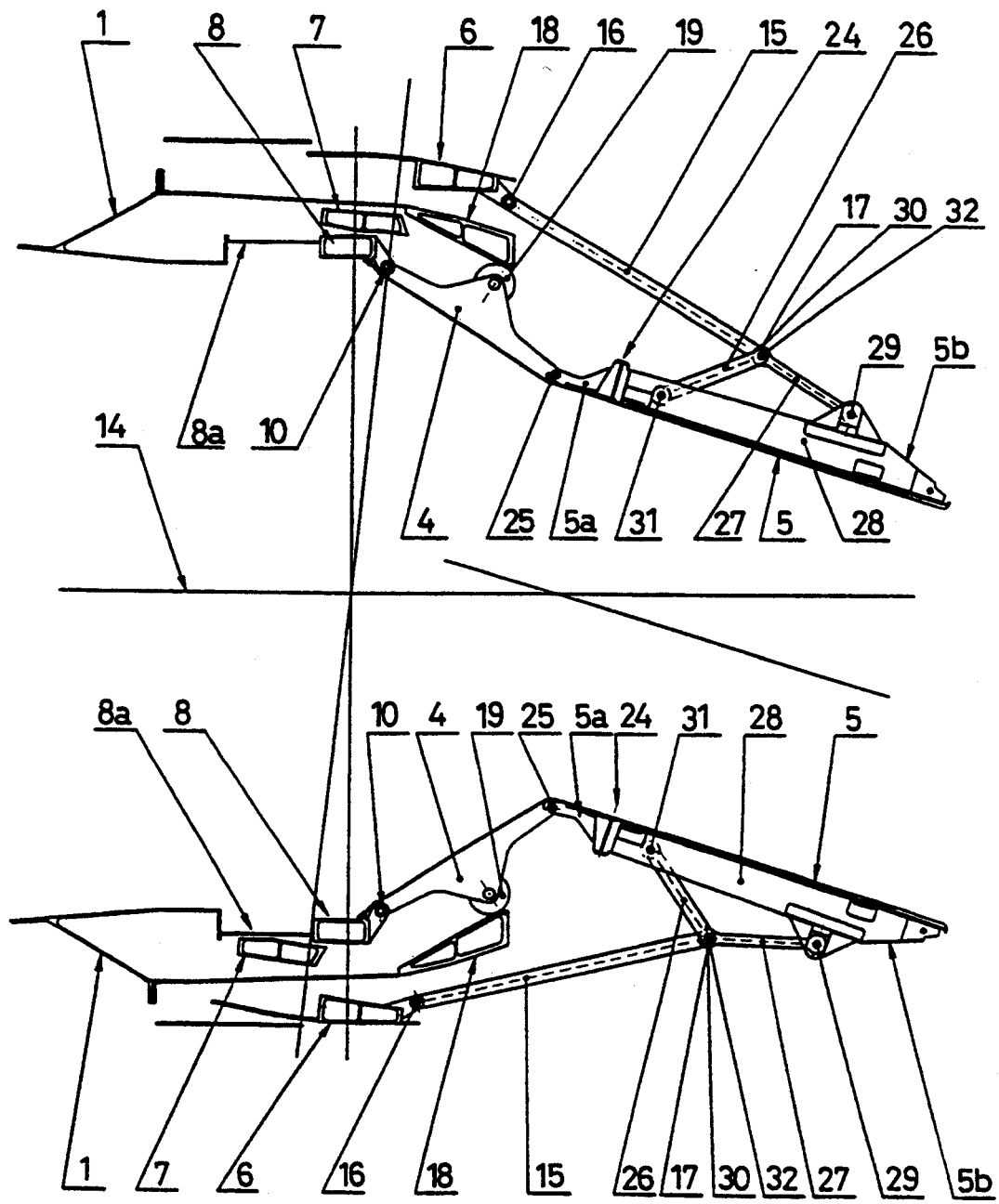
FIGS. 6 and 7 are longitudinal sections through the nozzle along the section line 5—5 of FIG. 2, with the nozzle in closed position and open position respectively, in both cases with orientation of the thrust.

In FIG. 5 the nozzle is shown in closed position without orientation of the flow, there being shown a longitudinal section thereof through the master petals, in the same way as in FIG. 6 in which the nozzle is shown in closed position with flow orientation; FIG. 7 shows the nozzle in open position, with flow orientation.

FIG. 8 shows the nozzle in open position without orientation of the flow.

FIGS. 9 and 10 are rear views of the nozzle, with and without orientation of the flow, in order to illustrate the radial and tangential movements experienced by the divergent master petals 5.

Figure 11:
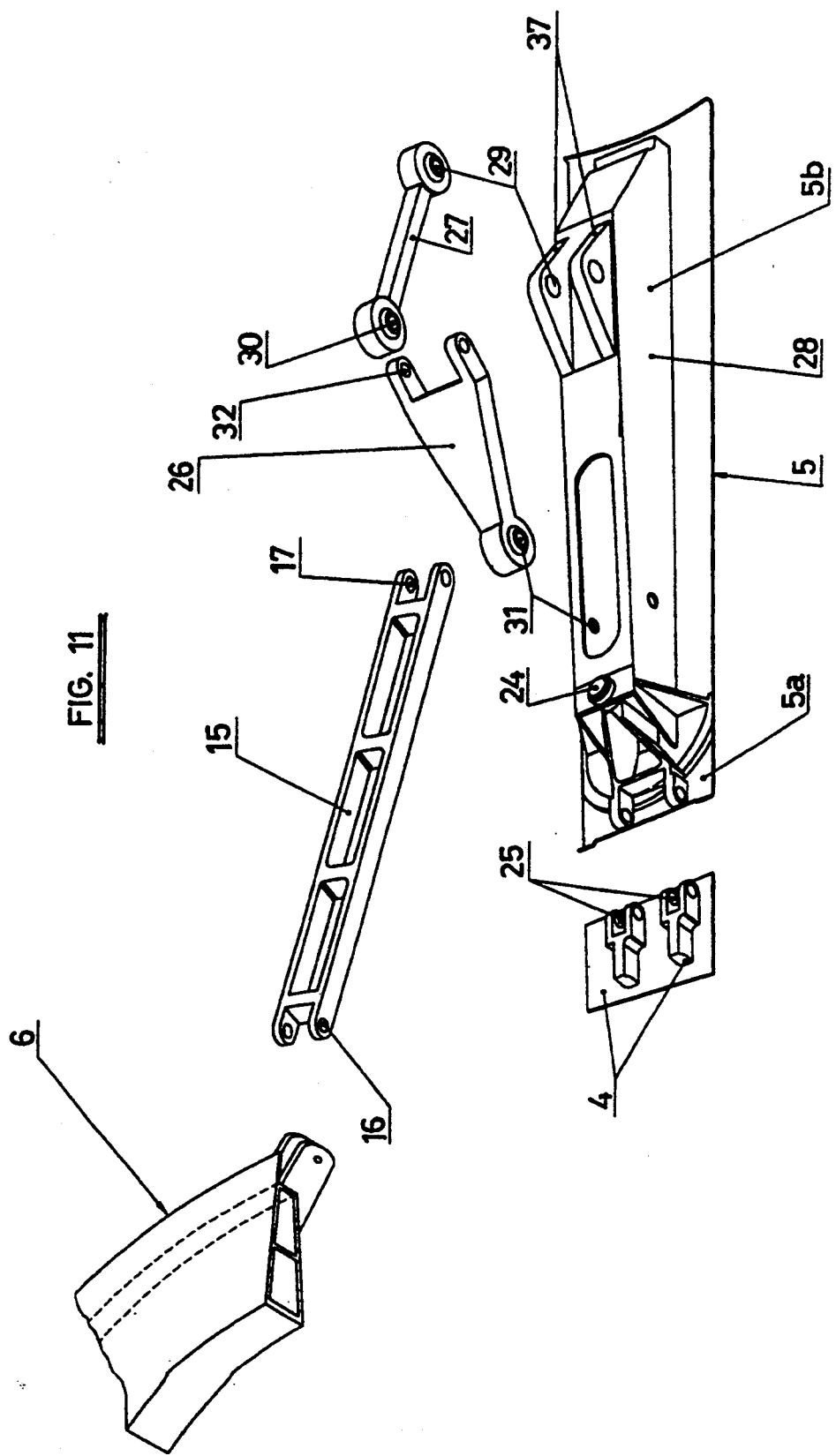
FIG. 11 is a partial perspective, exploded view of the braced system of the divergent zone of the nozzle, formed in accordance with the present invention.

FIG. 11 provides a perspective view of the mechanism in accordance with the present invention, together with the two lugs which prevent the rotary movement of the intermediate bar 27 around the theoretical axis which passes through the centers of the spherical joints 29 and 30.

For reasons of clarity, there have not been shown in FIGS. 5 to 8 and 11 the moving elements 35 and 36 which constitute the movable cover of the nozzle around the divergent section, similar to those described in Spanish Patent Application No. 9200369 of 1992. The movable elements 35 and 36 are shown in FIGS. 1, 3 and 4 only.

It is clear that the mechanism described in the present application is applicable to any type of axisymmetric nozzle orientable in its divergent zone and of variable geometry such that, in order to orient the flow, it has an outer annular part 6, regardless of whether the variation of the A8 throat area 12 and the orientation of the flow is effected by a single control system or by two independent control systems.

Furthermore, the mechanism described is applicable to a divergent master petal 5 formed of a single section instead of the two sections 5a and 5b shown in the figures and connected to the corresponding convergent master petal by means of a spherical joint instead of the cylindrical articulation 25 shown in the figures.

The features described make it possible to make the geometry defining the radial movement of convergent and divergent master and slave petals 4 and 5 independent of the geometry which defines the tangential movement of the divergent master petals 5 and, by means thereof, of the divergent slaves 34, so that, for a given law of variation of the A8 exit area 12, the tangential movement of the downstream sections 5b of the divergent master petals can be increased or decreased, in order to increase the range of A8 throat areas 12 in which it is possible to orient the flow at a given angle.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An orientable axisymmetric nozzle of variable geometry for a gas turbine engine for orienting the flow of gas through the engine and with respect to a longitudinal axis of the engine, which comprises:

a convergent section followed, in the direction of gas flow, by a divergent section, both being formed by: master petals;

a plurality of articulations for interconnecting the master petals; slave petals; and a plurality of articulations for interconnecting the slave petals, the master and slave petals being distributed circumferentially around the longitudinal axis of the engine;

the convergent section defining a variable area throat and the divergent section being of variable geometry in order to orient the flow in any direction on a cone located around the longitudinal axis of the engine;

an outer annular part;

control means for regulating the throat area;

control means for orienting the flow, by axial displacement and inclination of the outer annular part in any direction, with a center of rotation on a point on the longitudinal axis of the engine;

a plurality of biarticulated bars one for each divergent master petal, each biarticulated bar having a first end and an opposite end;

a plurality of cylindrical articulations one for each biarticulated bar for connecting the respective first ends of said biarticulated bars to the outer annular part, each cylindrical articulation being tangent to a theoretical circumference concentric to the longitudinal axis of the engine and being located in a theoretical plane perpendicular to such longitudinal axis;

a plurality of pairs of intermediate bars one pair for each divergent master petal, each pair being comprised of an upstream intermediate bar and a downstream intermediate bar and each intermediate bar having first and second ends;

a first spherical articulation for connecting the first ends of the intermediate bars of each pair together;

a second and third spherical articulation for respectively connecting the second ends of the intermediate bars of each pair to longitudinally aligned points on the corresponding divergent master petal; and a plurality of first cylindrical articulations, one for each pair of intermediate bars, for connecting the upstream intermediate bar of each pair to the corresponding biarticulated bar, each first cylindrical articulation having an axis which, when there is no orientation of the flow, is tangent to a theoretical circumference concentric to the longitudinal axis of the engine and is located in a theoretical plane perpendicular to said longitudinal axis of the engine.

2. A nozzle according to claim 1, in which each divergent master petal has an upstream end and a downstream end, and further including a plurality of respective fourth spherical articulations for connecting the upstream end of a divergent master petal to a corresponding convergent master petal, each divergent master petal being formed by a single section comprising a stiffened plate, the inner surface of which is contacted by the gas flow and the outer surface of which is connected to the corresponding intermediate bars by the second and third spherical articulations.

3. A nozzle according to claim 1, in which each divergent master petal is formed of two sections, an upstream section and a downstream section, and further including a second cylindrical articulation for connecting each section together, the axis of the second cylindrical articulation being perpendicular to a longitudinal axis of the master petal, a third cylindrical articulation for connecting the convergent and divergent master petals together, said third cylindrical articulation being tangential to a theoretical circumference concentric to the longitudinal axis of the engine and being located in a theoretical plane perpendicular to the longitudinal axis of the engine, the downstream section being formed by a stiffened plate, the inner surface of which is contacted by the gas flow and the outer surface of which is connected to the intermediate bars by the second and third spherical articulations.

4. A nozzle according to claim 2, wherein the first spherical articulation which connects the intermediate bar located downstream with the intermediate bar located upstream is located on the axis of the first cylindrical articulation which connects the biarticulated bar with the intermediate bar located upstream.

5. A nozzle according to claim 2, wherein lateral stops are provided between the downstream intermediate bar and the divergent master petal to prevent the rotation of said downstream intermediate bar around an axis which passes through the second and third spherical articulations connected to the ends of said downstream intermediate bar.

6. A nozzle according to claim 3, wherein the first spherical articulation which connects the intermediate bar located downstream with the intermediate bar located upstream is located on the axis of the first cylindrical articulation which connects the biarticulated bar with the intermediate bar located upstream.

7. A nozzle according to claim 3, wherein lateral stops are provided between the downstream intermediate bar and the divergent master petal to prevent the rotation of said downstream intermediate bar around an axis which passes through the second and third spherical articulations connected to the ends of said downstream intermediate bar.

* * * * *